Oct. 17, 1950     L. E. DOBSON ET AL     2,526,124
MOTOR VEHICLE TIRE PRESSURE INDICATOR

Filed March 21, 1947     2 Sheets-Sheet 1

INVENTORS
Leon E. Dobson
BY Don R. Dobson
ATTORNEYS

Oct. 17, 1950     L. E. DOBSON ET AL     2,526,124
MOTOR VEHICLE TIRE PRESSURE INDICATOR
Filed March 21, 1947     2 Sheets-Sheet 2
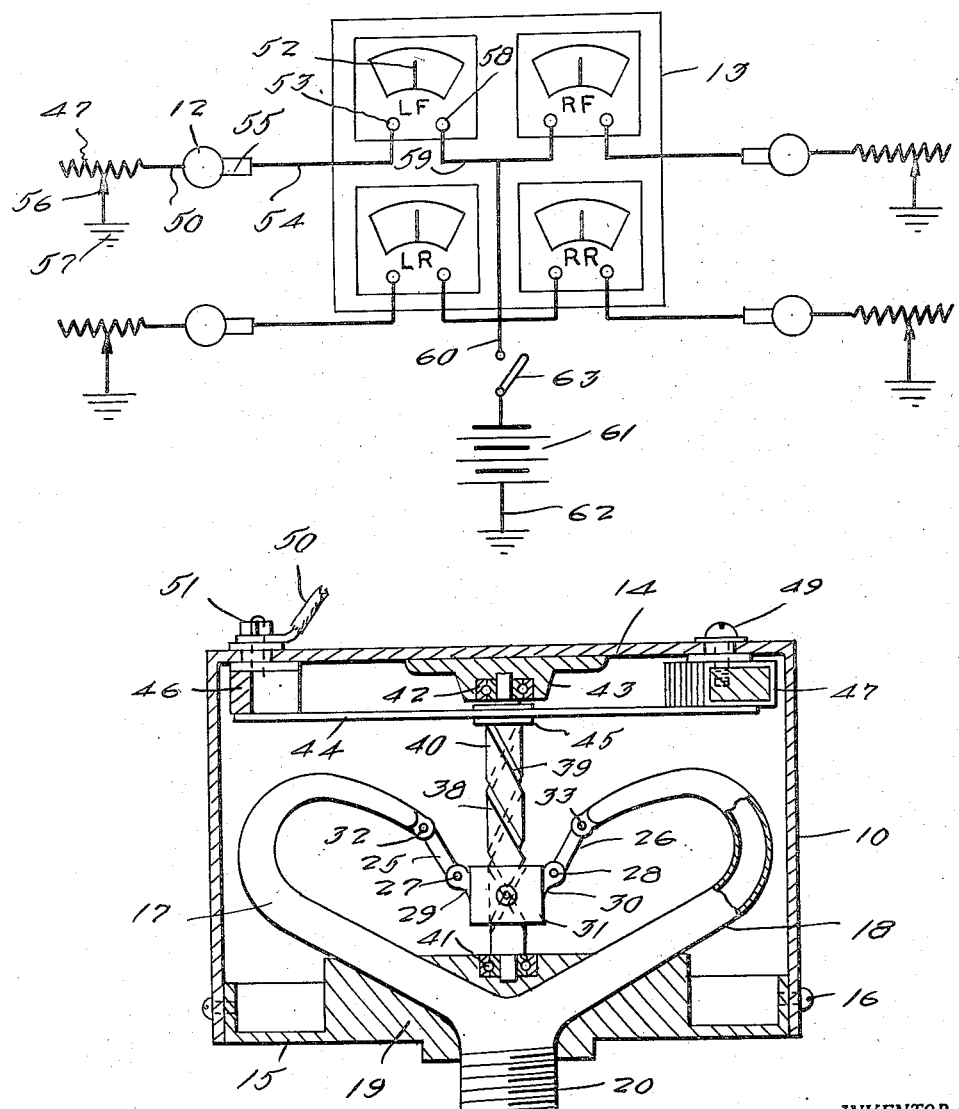

Patented Oct. 17, 1950

2,526,124

UNITED STATES PATENT OFFICE 2,526,124

MOTOR VEHICLE TIRE PRESSURE INDICATOR

Leon E. Dobson and Don R. Dobson, Holden, Utah

Application March 21, 1947, Serial No. 736,270

3 Claims. (Cl. 73—390)

1

This invention relates to pressure-indicating devices particularly associated with tires of wheels of motor vehicles, and in particular includes a pressure-responsive element in the hub of a wheel connected to the usual inner tube valve of a tire and electrical contacts extending from the element to a contact ring on the wheel, and from the ring to an indicator preferably on the instrument board of the vehicle.

The purpose of this invention is to provide means for indicating the pressure of motor vehicle tires independently and continuously as the vehicle is operated or when the vehicle is stationary.

Various devices have been provided for indicating the pressures of tires of motor vehicles through indicating devices on the instrument board, but these have been found inefficient because the pressure-responsive element does not accurately convert the air pressure to electric impulses with sufficient accuracy. With this thought in mind, this invention contemplates a pressure-responsive element having two opposed pressure-responsive arcuate tubes with the free ends of the tubes connected by links to a collar on a rotatable shaft, wherein the shaft carries a pointer in slidable contact with a resistance coil, and the pressure-responsive element is connected to the tire, whereas the resistance coil is connected to an indicator positioned on the instrument board or the like.

The object of this invention is, therefore, to provide an improved, efficient converting element, wherein air pressure, particularly in the tires of motor vehicles, is converted into electrical impulses and conveyed to indicators at remote points, wherein the converting means may be incorporated in the hub of a wheel of the vehicle.

Another object of the invention is to provide an air pressure converting device adapted to be used on wheels of motor vehicles which may be connected to a tire valve of the inner tube of a tire of the vehicle.

Another object of the invention is to provide a pressure-converting device for tires of motor vehicles, wherein the pressure of a tire of a vehicle is converted into electrical impulses, and the electrical impulses are transmitted through a rotating element in the hub of the wheel of the vehicle.

A further object of the invention is to provide a device for indicating the pressure of the individual tires of the wheels of a motor vehicle on the instrument board of the vehicle, which is of a simple and economical construction.

2

With these and other objects in view, the invention embodies a comparatively small, compact casing having a readily influenced, pressure-responsive element incorporated therein, a connection from the pressure-responsive element to a valve of an inner tube of a tire of the vehicle, means mounting the device in a hub of the wheel of the vehicle, a contact ring on the wheel of the vehicle with a connection to a resistance element in the device, indicators on the instrument board of the vehicle, and suitable connections from the indicators to the contact rings of the wheels.

Other features and advantages of the invention will appear from the following description taken in connection with the drawings, wherein:

Figure 2 is a cross-section through the unit in which the pressure-responsive element and resistance are installed.

Figure 5 is a diagrammatic view illustrating an electric circuit in combination with indicating devices, wherein the pressure of the tires of the wheels of a vehicle influences the needles of the indicating devices.

Figure 1:
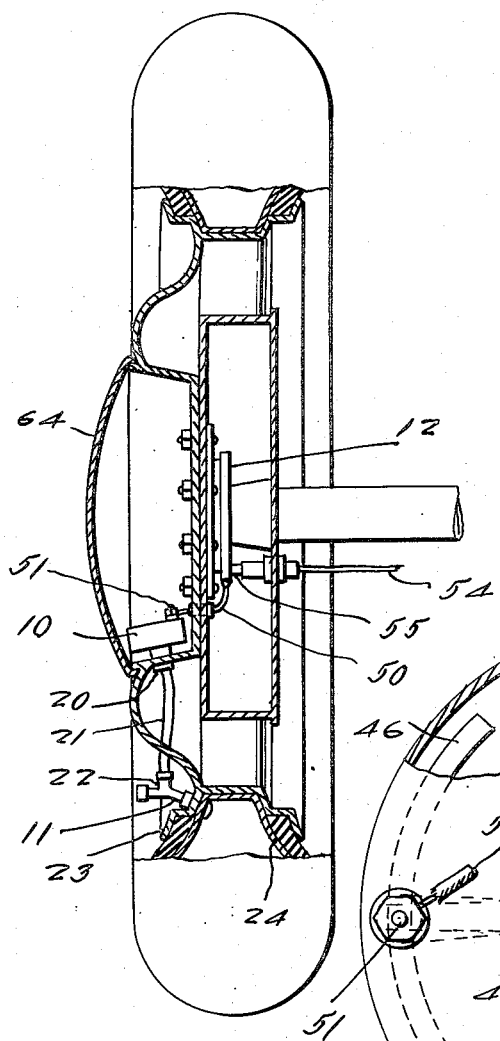
Figure 1 is a view showing an end elevation of a wheel of a motor vehicle, with parts broken away, showing a section through the hub of the wheel and illustrating the relative positions of the various parts of a pressure-indicating device.

Referring now to the drawings, wherein like reference characters indicate corresponding parts, the tire pressure-indicating device of this invention includes a pressure-converting unit 10, a tire valve 11, a contact ring 12 and an indicator panel 13.

Figure 4:
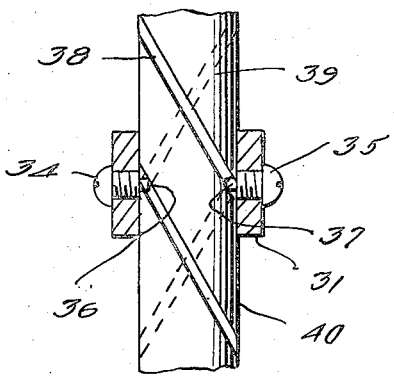
Figure 4 is a detail showing the contact arm post with a double thread thereon.

The pressure-responsive unit 10 includes a comparatively small, compact housing having a plate 14 providing a closure for the upper end and a head 15 which is secured in the lower end of the casing by screws 16. A pressure-responsive element having outwardly extending arcuate tubular arms 17 and 18 with gradually reducing areas is mounted in a centrally disposed section 19 of the head 15, and the lower end is provided with a threaded nipple 20 that is connected by a tube 21 to a branch 22 of the tire valve 11. The valve extends through the rim 23 of the wheel and into the inner tube 24, as shown in Figure 1. The small ends of the tubular sections 17 and 18 of the pressure-responsive element are pivotally connected to a wiper contact arm by links 25 and 26 with the links pivotally mounted through pins 27 and 28 to ears 29 and 30 of a collar 31. The opposite ends of the links are pivotally connected by pins 32 and 33 to the small ends of the sections 17 and 18 of the pressure-responsive element. The collar 31, as illustrated in Figure 4, is provided with screws 34 and 35 having pins 36 and 37 on their inner ends, and the pins extend into double threads or grooves 38 and 39 of the post 40, as shown. As the collar 31 is moved upward or downward by the pressure-responsive element, the pins 36 and 37, traveling in the grooves 38 and 39, will cause the post to rotate. The lower end of the post is rotatably mounted in a bearing 41 in the section 19, and the upper end is rotatably mounted through a bearing 42 in a boss 43 on the lower surface of the upper plate 14 of the unit.

Figure 3:
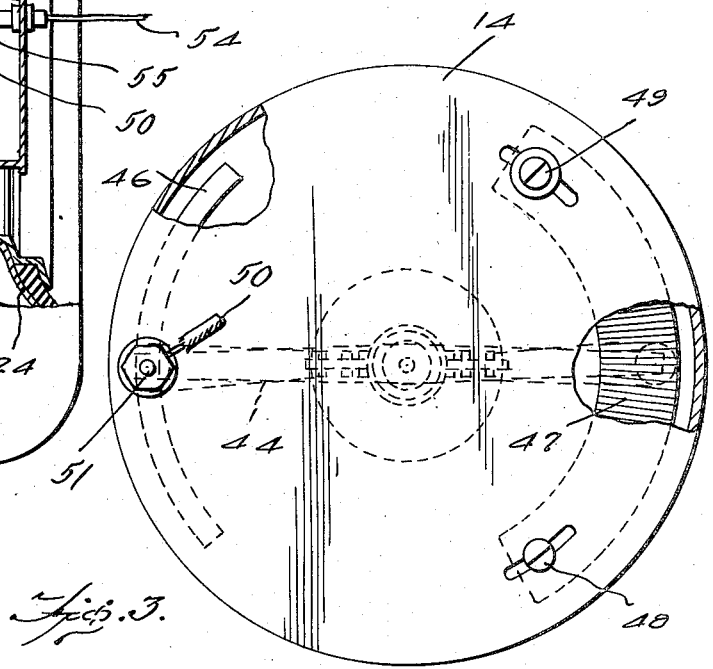
Figure 3 is a plan view showing the upper surface of the unit with parts broken away, showing the resistance and end of a contact ring, and with the contact arm shown therein in dotted lines.

A contact arm 44 is fixedly mounted on the post 40 through a hub 45 and with the arm in the position shown in Figures 2 and 3, one end is in wiping contact with a contact bar 46, whereas the opposite end is in wiping contact with a resistance 47. With one end of the resistance 47 grounded at the point 48, and the opposite end insulated from the casing through a screw 49 and contact bar 46 connected to contact ring 12 through a wire 50 attached to the post 51, the current passing through the unit will be influenced by the position of the arm 44.

In the diagram illustrated in Figure 5, the panel 13 includes an indicating instrument for each of the wheels of the vehicle, and each instrument, which is provided with a needle 52, is provided with a terminal 53 which is connected by a wire 54 to a brush 55 that is in wiping contact with the contact ring 12 of each of the wheels of the vehicle, and the contact rings are illustrated as connected through the wires 58 to one of the resistance coils 47 of the unit 10. In the diagram the contact arms 44 of the units are indicated by the points 56, and these are connected to grounds, as indicated at 57. The opposite terminals 58 of the indicators are connected through wires 59 and 60 to a battery 61, and the battery is grounded through a wire 62. The wire 60 is provided with a switch 63 through which the circuit to the indicators may be broken when the device is not in use.

In the design shown, the contact ring 12 is illustrated as mounted in the brake drum of the vehicle wheel, and the unit 10 is shown as positioned in the area under the hub cap 64. It will be understood that the parts may be located in any suitable positions or mounted in combination with the wheel in any manner.

The tire pressure-indicating device of this invention, therefore, includes pressure-responsive elements directly connected to the inner tubes of the tires of the vehicle through air valves of the tubes and a resistance with a wiper arm actuated by the pressure-responsive elements, and indicating means preferably on the instrument board of the vehicle directly connected to the device to indicate the position of the wiper arm. With the parts arranged in this manner, the pressure of each tire of the vehicle is indicated independently on a panel on the instrument board of the vehicle, wherein the operator of the vehicle may determine instantly the pressure of the tires of the vehicle.

It will be understood that modifications may be made in the design or arrangement of the parts without departing from the spirit of the invention.

What is claimed is:

1. The combination with a motor vehicle including a body provided with a dash panel, wheels each having a hub supporting said vehicle, a tire casing mounted on each of said wheels, an inner tube in each of said casings, of a device for measuring the pressure in each of said inner tubes operatively connected to said tubes and transmitting said pressure measurements to said dash panel, said device comprising a housing mounted inside the hub of each of said wheels, a pressure responsive element secured within each of said housings and operatively connected to the adjacent inner tube, a resistance mounted within each of said housings and grounded to the body of said vehicle, a wiper arm positioned in each of said housings with its one end in slidable engagement with the resistance mounted therein, a double-threaded shaft rotatably mounted in each of said housings, a collar slidably positioned on said shaft, said collar being provided with a pair of opposed transversely extending pins operatively engaging the threads of said shaft, said collar being operatively connected to said pressure responsive element, said wiper arm being secured to said shaft and rotatable with the latter, brush means mounted adjacent each of said wheels in electrical connection with the other end of each of said wiper arms and electrically connecting the latter to said dash panel, and a source of electrical current grounded to the body of said vehicle and electrically connected to said dash panel, whereby a change in inner tube pressure causes said element to position the wiper arm on said resistance to thereby correspondingly change the flow of current from said current source to the dash panel.

2. The combination with a motor vehicle including a body provided with a dash panel, wheels each having a hub supporting said vehicle, a tire casing mounted on each of said wheels, an inner tube in each of said casings, of a device for measuring the pressure in each of said inner tubes operatively connected to said tubes and transmitting said pressure measurements to said dash panel, said device comprising a housing mounted inside the hub of each of said wheels, a generally V-shaped pressure responsive element secured within each of said housings and having a pair of outwardly extending arcuate tubular arms, the body portion of said element being operatively connected to the inner tube adjacent thereto, a resistance mounted within each of said housings and grounded to the body of said vehicle, a wiper arm positioned in each of said housings with its one end in slidable engagement with the resistance mounted therein, a double-threaded shaft rotatably mounted in each of said housings, a collar slidably positioned on said shaft, said collar being provided with a pair of opposed transversely extending pins operatively engaging the threads of said shaft, said collar being operatively connected to the arms of said pressure responsive element, said wiper arm being secured to said shaft and rotatable with the latter, brush means mounted adjacent each of said wheels in electrical connection with the other end of each of said wiper arms and electrically connecting the latter to said dash panel, and a source of electrical current grounded to the body of said vehicle and electrically connected to said dash panel, whereby a change in inner tube pressure causes said element to position the wiper arm on said resistance to thereby correspondingly change the flow of current from said current source to the dash panel.

3. The combination with a motor vehicle including a body provided with a dash panel, wheels each having a hub supporting said vehicle, a tire casing mounted on each of said wheels, an inner tube in each of said casings, of a device for measuring the pressure in each of said inner tubes operatively connected to said tubes and transmitting said pressure measurements to said dash panel, said device comprising a housing mounted inside the hub of each of said wheels, a generally Y-shaped pressure responsive element secured within each of said housings and having a pair of outwardly extending arcuate tubular arms, the body portion of said element being operatively connected to the inner tube adjacent thereto, a resistance mounted within each of said housings and grounded to the body of said vehicle, a wiper arm positioned in each of said housings with its one end in slidable engagement with the resistance mounted therein, means operatively connecting each of the pressure responsive elements to the respective wiper arms, brush means mounted adjacent each of said wheels in electrical connection with the other end of each of said wiper arms and electrically connecting the latter to said dash panel, and a source of electrical current grounded to the body of said vehicle and electrically connected to said dash panel, whereby a change in inner tube pressure causes said element to position the wiper arm on said resistance to thereby correspondingly change the flow of current from said current source to the dash panel.

LEON E. DOBSON.
DON R. DOBSON.

REFERENCES CITED

The following references are of record in the file of this patent:

UNITED STATES PATENTS

| Number | Name | Date |
| --- | --- | --- |
| 1,811,769 | Weaver | June 23, 1931 |
| 1,908,503 | Behrend et al. | May 9, 1933 |
| 2,224,798 | Pyatt | Dec. 10, 1940 |
| 2,229,192 | Schultz | Jan. 21, 1941 |
| 2,270,148 | Stowe | Jan. 13, 1942 |

FOREIGN PATENTS

| Number | Country | Date |
| --- | --- | --- |
| 199,632 | Great Britain | June 28, 1923 |